2,936,315

LUBRICATING COMPOSITION AND PROCESS FOR PREPARING SAID COMPOSITION

Arthur C. Whitaker, Pittsburgh, Pa., assignor to Gulf Research & Development Company, Pittsburgh, Pa., a corporation of Delaware No Drawing. Application April 15, 1958
Serial No. 728,539

7 Claims. (Cl. 260—410.9)

This invention relates to new lubricants and their preparation and more particularly to lubricants prepared from by-products of the Oxo synthesis process.

As is well known, the Oxo process is widely used to produce oxygenated organic compounds. Briefly, the process comprises reacting carbon monoxide, hydrogen and a mono-olefin such as heptene in the presence of a metallic hydroformylation reaction catalyst in order to form a mixture of oxygenated products, principally aldehydes having one more carbon atom per molecule than the original mono-olefin. The aldehydic hydroformylation product is then subjected to catalytic hydrogenation to form a mixture containing predominantly isomeric branched chain primary monohydric alcohols containing one more carbon atom per molecule than the original mono-olefin. The hydroformylation reaction is normally effected by reacting the mono-olefin with equimolar portions of hydrogen and carbon monoxide at a pressure of about 1500 to about 4500 pounds per square inch gauge and at a temperature of about 260° to about 460° F. in the presence of a metallic hydroformylation reaction catalyst such as cobalt 2-ethylhexanoate. The catalytic hydrogenation of the aldehydic hydroformylation product is normally effected with gaseous hydrogen in the presence of a suitable hydrogenation catalyst such as nickel, at a pressure of about 50 to about 5000 pounds per square inch gauge and at a temperature of about 290° to 400° F. Distillation of the products of the Oxo synthesis reaction will yield a major proportion of a mixture of isomeric primary monohydric alcohols containing one more carbon atom per molecule than the mono-olefin charged to the hydroformylation reaction and an Oxo bottoms distillation residue comprising a minor fraction, for example, about 5 percent, of the overall Oxo synthesis product.

The Oxo bottoms are complex mixtures of compounds having various carbon structures in the molecules and having varied molecular weights. It is believed that the Oxo bottoms comprise complex mixtures containing predominantly materials from the group of acetals, hemi-acetals, esters, ethers, aldol condensation products, alcohols and acids. Thus, for example, the Oxo bottoms obtained as still bottoms from the distillation of $C_8$ Oxo alcohols from the product obtained by subjecting mixed heptene isomers to the Oxo synthesis process might contain, among other materials, $C_{16-17}$ esters, $C_8$ acids, $C_{16}$ alcohols, $C_{16}$ aldol condensation products, $C_{24}$ acetals, $C_{16}$ hemi-acetals and $C_{16}$ ethers. The Oxo bottoms depending upon the efficiency of the distillation operation may also contain a percentage of the main alcohol product.

Separation or isolation of the various constituents comprising the Oxo bottoms to obtain substantially pure homogeneous fractions of relatively pure compounds is extremely difficult. For these reasons, the difficultly separable mixtures comprising the Oxo bottoms are generally of little commercial value and in some cases are simply sent to slop or used in relatively cheap fuels.

I have now found that valuable lubricants can be obtained by esterifying a monobasic acid with a portion of the Oxo bottoms. The lubricants so obtained possess very low pour points, that is, they remain liquid over wide temperature ranges and are thus especially suitable for low temperature lubricating uses. Due to the inexpensive materials utilized in their production, the new lubricants are particularly advantageous economically.

In accordance with the invention, a monobasic acid is esterified with a portion of the Oxo bottoms which comprises the Oxo bottoms from which approximately 29 percent by weight of the lower boiling material and approximately 29 percent of the higher boiling material has been removed. In other words, the portion of Oxo bottoms utilized to prepare the lubricants of this invention corresponds approximately to the 30–70 percent by weight cut of the Oxo bottoms remaining after removal of the main alcohol product. Any portion of the above-defined fraction of Oxo bottoms can be used. However, for maximum economy it is preferred to utilize substantially the entire fraction. The specific boiling range of the portion of Oxo bottoms which is utilized to produce the lubricants of the invention will obviously depend upon the original olefin charged to the hydroformylation reaction stage, that is, the boiling range of the desired portion of Oxo bottoms is the higher, the higher the molecular weight of the olefin charged to the Oxo synthesis process. For example, when heptene comprises the feed to the Oxo synthesis process, the desired esterifiable portion of the Oxo bottoms will boil between about 172 and 185° C. at a pressure of about 20 millimeters of mercury. Similarly, when nonene is the olefin employed, the desired esterifiable portion of Oxo bottoms will boil between about 200 and 215° C. at 10 millimeters of mercury. In general, the portion of the Oxo bottoms which is utilized to form the lubricants of this invention will have an initial boiling point between 160° C. and 240° C. and an end point between about 180° C. and 300° C. at a pressure of about 10 to about 20 millimeters of mercury.

The Oxo bottoms from which the desired esterifiable portion is obtained include the distillation residue obtained from an Oxo synthesis process wherein the olefin charged to the hydroformylation reaction stage is a $C_6$ to $C_{16}$ olefin. Thus, Oxo bottoms having the following analysis can satisfactorily be used in the present invention.

| | Percent by weight |
|---|---|
| $C_n$ compounds: alcohol | 2–25 |
| $C_{2n}$ compounds: | |
| Aldehyde | 2–10 |
| Alcohol | 10–25 |
| Ester | 2–10 |
| Ether | 2–10 |
| Hemi-acetal | 2–10 |
| Aldol | ≦1 |
| Ketoaldehyde | 0–5 |
| Glycol | 2–15 |
| Acid | ≦5 |
| $C_{3n}$ compounds: | |
| Aldehyde | 3 |
| Ester | 2–15 |
| Diether | 2–10 |
| Higher molecular weight compounds | ≦20 | wherein $n=7$ to 17.

The acids which are used to prepare the low pour point lubricants of this invention are the monobasic acids having from 1 to about 18 carbon atoms in the molecule. The acids can be synthetic acids or natural fatty acids obtained from animal or vegetable fats or oils. Unsaturated acids should be hydrogenated using a nickel or other suitable hydrogenation catalyst. Alternatively, and more preferably, the ester product of the unsaturated acid can be hydrogenated using a suitable hydrogenation catalyst. Examples of suitable acids are acetic acid, acrylic acid, butyric acid, caprylic acid, pelargonic acid, caproic acid, undecanoic acid, lauric acid, tridecanoic acid, myristic acid, pentadecanoic acid, palmitic acid, margaric acid, stearic acid and oleic acid. The straight chain acid or any branched chain isomers can be used. Any mixture of these acids can also be used. In selecting the acid to be used for esterification, the viscosity characteristics of the product are a controlling factor. The esterified product should have a viscosity of about 40 to about 4000 Saybolt Universal seconds at 100° F. Thus, when the desired esterifiable fraction of the Oxo bottoms is composed of heavy high-boiling materials containing hydroxyl groups as in the case of the bottoms resulting from an Oxo synthesis process wherein a higher olefin such as a $C_{16}$ olefin is employed as feed, lower molecular weight acids, for example, acetic acid, are preferably employed. On the other hand, when a lower olefin such as hexene comprises the feed to the Oxo synthesis process, a lighter, lower boiling fraction of Oxo bottoms will be utilized to form the lubricant, and in this instance higher molecular weight acids are preferred.

To prepare the new lubricants of this invention, the desired esterifiable fraction of the Oxo bottoms is obtained in a suitable manner such as by fractional distillation of the bottoms residue resulting from an Oxo synthesis process. The desired Oxo bottoms fraction is then reacted with the selected acid to form the esterified product. For the esterification reaction the reactants are preferably heated and an esterification catalyst such as para-toluene sulfonic acid or sulfuric acid is used to increase the rate of the action. As the esterification reaction proceeds, water is evolved and this water should be removed from the reaction zone in order that equilibrium not be reached. If the temperature at which the reaction is carried out is sufficiently high the water can be removed in vapor form. In this respect the esterification reaction can be carried out at a temperature of about 100° up to the boiling point of the charge to the esterification reactor. Lower temperatures can be employed for the esterification if means are provided to remove the water. For example, the esterification reaction can be carried out at about 60° C. by the addition of ethyl isopropyl ether which would effectively remove the water by azeotrope formation. Completion of the esterification reaction is indicated when no more water is evolved. Preferably, the crude reaction product is then purified by distillation to obtain an ester product boiling within the lubricating oil range and having excellent low temperature lubricating characteristics.

The following example will further illustrate the invention.

Example I

Mixed heptene isomers are reacted with hydrogen and carbon monoxide under a pressure of 3500 pounds per square inch gauge and at a temperature of 350° F. in the presence of a cobalt octanoate catalyst to yield an iso-octyl aldehyde hydroformylation product. This aldehydic hydroformylation product is then hydrogenated with gaseous hydrogen at a pressure of about 1000 pounds per square inch gauge and a temperature of about 380° F. in the presence of a reduced nickel oxide catalyst. The hydrogenated product is then distilled at temperature of about 330° F. to give an overhead product consisting of iso-octyl alcohol and a bottoms residue having the following analysis:

| | Percent by weight |
|---|---|
| Eight carbon compounds: isooctyl alcohol | 27.2 |
| Sixteen carbon compounds: | |
|    Isohexadecyl aldehyde | 6.3 |
|    Isohexadecyl alcohol | 18.8 |
|    Isooctyl isooctanoate | 3.6 |
|    Diisooctyl ether | 5.6 |
|    Hemiacetal | 5.2 |
|    Aldol | 0.3 |
|    Ketoaldehyde | 1.4 |
|    Glycol | 8.3 |
|    Isohexadecanoic acid | 0.3 |
| Twenty-four carbon compounds: | |
|    Isotetracosyl aldehyde | 0.6 |
|    Ester | 7.8 |
|    Diether | 3.8 |
| High boiling polymers | 6.3 |

The above-identified bottoms residue after being substantially freed of isooctyl alcohol, was then distilled under reduced pressure to give cuts as follows:

Cut No. 1—143–162° C. at 20 millimeters corresponding to a 27–30 percent by weight cut Cut No. 2—172–185° C. at 20 millimeters corresponding to a 38–44 percent by weight cut Cut No. 3—205–225° C. at 20 millimeters corresponding to a 27–30 percent by weight 280 grams of Cut No. 1 was esterified with 120 grams of lauric acid utilizing para-toluene sulfonic acid as a catalyst. After heating for one-half hour at a temperature of about 140° C. the expected amount of water had been recovered indicating that the esterification had been essentially completed. The crude ester product was washed with dilute caustic, dried and distilled. Approximately one-third of the charge to the still boiled between 188° and 243° C. at 2.7 millimeters of mercury. This material is designated Oxo bottoms laurate.

Following the same procedure, 370 grams of Cut No. 2 was esterified with 250 grams of pelargonic acid. The crude ester product was washed with dilute caustic, dried and distilled. Approximately 80 percent of the ester product boiled between 205 and 225° C. at 2 millimeters of mercury. This material is designated Oxo bottoms pelargonate.

The higher boiling Cut No. 3 was not esterifiable to any appreciable degree and was not reacted with an acid.

Analysis of the ester products and Cut. No. 3 of the bottoms was as follows:

| | Oxo Bottoms Laurate | | Oxo Bottoms Pelargonate | | Cut No. 3 Oxo Bottoms | |
|---|---|---|---|---|---|---|
| Viscosity (ASTM D-445): | | | | | | |
|   210° F | 2.57 centistokes | 34.9 SUS | 2.68 centistokes | 35.3 SUS | 2.53 centistokes | 34.8 SUS. |
|   100° F | 9.01 centistokes | 55.5 SUS | 10.53 centistokes | 60.8 SUS | 10.94 centistokes | 62.2 SUS. |
|   −65° F | Solid | | 9499 | 43561 | 30216 | 138565. |
| Viscosity Index | 131 | | 101 | | 51 | |
| Pour Point | −35 | | Below −75 | | Below −75 | |
| Flash Point | | | 385° F. | | | |

It is readily seen from the above data that esters prepared from the portion of Oxo bottoms material boiling within the range herein disclosed are superior low temperature lubricants. Thus, the pour point of these esters is extremely low and exceeds the specification for most lubricants used at low temperatures which require a pour point of at least −65° F. Moreover, these esters not only remain liquid at low temperatures but the viscosity of the esters is well within the maximum permissible viscosity which has been indicated as being 13,000 centistokes at a temperature of −65° F. In addition, because of the low cost of the Oxo bottoms and the monobasic acid utilized in their production, the novel lubricants offer decided economic advantages over prior art ester lubricants which are generally prepared from relatively expensive dibasic acids and alcohols.

The expression "consisting essentially of" as used in the claims means that the lubricating composition is made up of the components recited and these components are the characterizing ones. But the expression does not exclude the presence of minor amounts of materials which do not materially affect the basic and novel characteristics of the composition.

Those modifications and equivalents which fall within the spirit of the invention and the scope of the appended claims are to be considered part of the invention.

I claim:

1. A lubricant composition consisting essentially of the reaction product of an acyclic aliphatic unsubstituted monobasic acid containing from 1 to about 18 carbon atoms and a portion of the still bottoms resulting from the production of alcohol by the Oxo synthesis process, said portion of Oxo bottoms being selected from the Oxo bottoms product from which about 29 percent by weight of the lower boiling components and about 29 percent by weight of the higher boiling components have been removed.

2. The composition of claim 1 wherein the said Oxo bottoms reactant is obtained from the still bottoms resulting from an Oxo synthesis process wherein the olefin employed in the hydroformylation reaction stage has from 6 to 16 carbon atoms.

3. A lubricating composition consisting essentially of the reaction product of an acyclic aliphatic unsubstituted monobasic acid containing from 1 to about 18 carbon atoms and a portion of the bottoms product resulting from an Oxo synthesis process wherein the olefin employed in the hydroformylation reaction stage is heptene, the said portion boiling from about 172° C. to about 185° C. at a pressure of about 20 millimeters of mercury.

4. A lubricating composition consisting essentially of the reaction product of an acyclic aliphatic unsubstituted a monobasic acid containing from 1 to about 18 carbon atoms and a portion of the bottoms product resulting from an Oxo synthesis process wherein the olefin employed in the hydroformylation reaction stage is nonene, the said portion boiling from about 200° C. to about 215° C. at a pressure of about 10 millimeters of mercury.

5. A process of producing a lubricating composition which comprises removing about 29 percent by weight of the lower boiling components and about 29 percent by weight of the higher boiling components from the still bottoms product resulting from the production of alcohol by the Oxo synthesis process and then reacting with the desired intermediate portion of Oxo bottoms to form an esterified mixture, an acyclic aliphatic unsubstituted monobasic acid containing from 1 to about 18 carbon atoms.

6. The process of claim 5, utilizing the still bottoms product resulting from the production of alcohol by an Oxo synthesis process wherein the olefin employed in the hydroformylation stage has from 6 to 16 carbon atoms.

7. A process for producing a lubricant composition which comprises fractionating the bottoms product resulting from an Oxo synthesis process wherein the olefin employed in the hydroformylation reaction stage is heptene to obtain a cut boiling between about 172° C. and about 185° C. at a pressure of about 20 millimeters of mercury and thereafter reacting with the said cut to form an esterified mixture, an acyclic aliphatic unsubstituted monobasic acid containing from 1 to about 18 carbon atoms.

References Cited in the file of this patent

UNITED STATES PATENTS

| | | |
|---|---|---|
| 2,549,455 | Gresham | Apr. 17, 1951 |
| 2,632,021 | Robison | Mar. 17, 1953 |
| 2,648,694 | Mason | Aug. 11, 1953 |
| 2,796,411 | Mertzweiller | June 18, 1957 |